June 8, 1926.

O. WITTEL

MOTION PICTURE FILM GUIDE

Filed Nov. 18, 1924

1,588,082

INVENTOR,
Otto Wittel,
BY P. L. Stinchfield
N. M. Perrins
ATTORNEYS.

Patented June 8, 1926.

1,588,082

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM GUIDE.

Application filed November 18, 1924. Serial No. 750,601.

My invention relates to motion picture apparatus and more particularly to a film guide for holding a band of film in contact with a driving sprocket. The objects of my invention are to make a device for this purpose that is simple and inexpensive to manufacture, may be struck up from a single piece of sheet metal and will be particularly easy for an unskilled user to operate. Other objects will appear in the following specification in which reference will be made to the accompanying drawing wherein the same reference characters indicate the same parts in all the figures.

Figure 1:
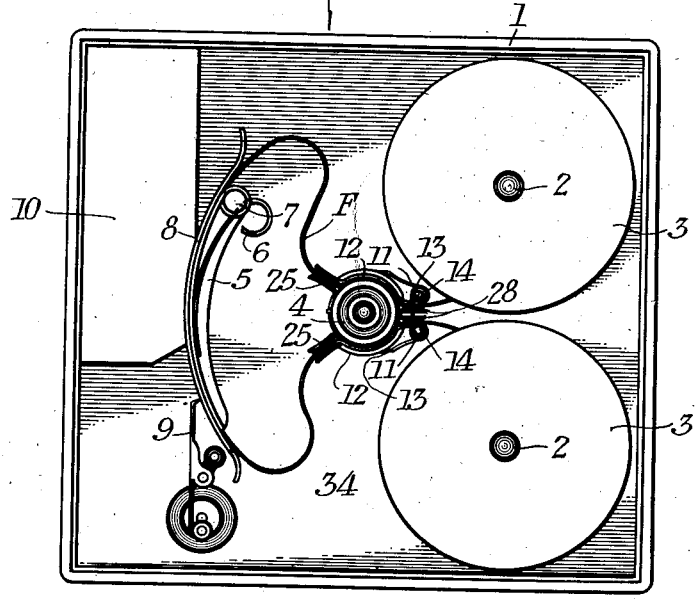
Fig. 1 is a side elevation of a motion picture camera with one side of the casing removed and embodying one form of my invention.

A motion picture camera in which my improved mechanism, shown as incorporated, is of the simple box type and comprises a casing 1 which may be opened at one side, as shown, to render accessible the film-threading compartment. In this are shafts 2 upon which are the film reels 3 between which a loop of film F passes in both directions over a single driving sprocket 4 to the film gate. The latter comprises a rigid arcuate member 5 which is normally fixed but has a resilient latch 6 permitting its removal from the locating pin 7. The film passes around this guide and is held in contact with it by the complementary spring-pressed guide member 8. The film is advanced by an intermittent claw mechanism 9. The objective, finder and shutter are in the compartment 10. The elements above described do not constitute a part of my invention. Upon each side of the sprocket 4 are mounted on pivots 11, film guide members 12, which are pressed by a spring element 13 struck from a single piece of resilient wire against the opposite sides of the sprocket. This spring member 13 has convolutions 14 embracing the pins 11 and constituting hinges and extensions 15 bearing against the back of the projections 18 on the film guides.

Figure 2:
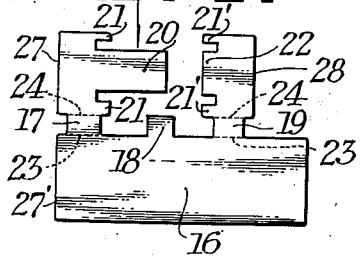
Fig. 2 is a plan of the blank from which my improved film guide is bent up.
Figure 6:
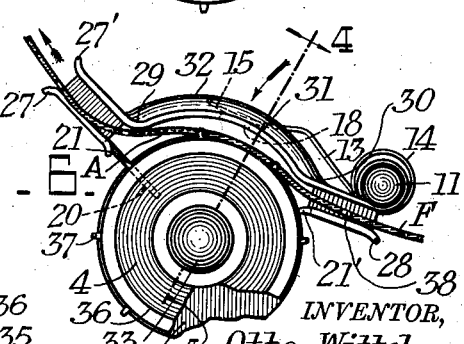
Fig. 6 is a side view of the sprocket and guide with the latter in operative position.
Figure 4:
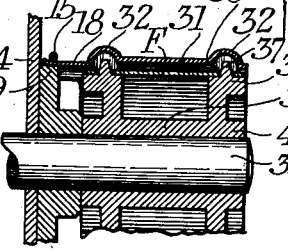
Fig. 4 is a section through the sprocket and guide with the latter in operative position, being taken along the line 4—4 of Fig. 6.

The guide is struck from a blank, shown in Fig. 2, and comprising a rectangular body portion 16 having along one edge three projections 17, 18 and 19. The projection 17 has a long tongue 20 projecting longitudinally of the blank and two shorter tongues 21, while the projection 19 has short tongues 21′ opposite to the tongues 21 and a central short tongue 22. The central projection 18 is left unbent for a purpose to be hereinafter described. The projections 17 and 19 are bent along the dotted lines 23 and 24 so that the main portions overhang the blank 16 and form open sided channel members 25 and 26. The outer edges 27 and 28 of the projections 17 and 19 and edge 27′ of the body portion 16 are slightly flared as are the ends of the tongues 21, 21′ and 22. The channel members 25 and 26 are bent at an angle to the central portion 31, as indicated at 29 and 30 and the central portion is bowed and has formed therein longitudinal beads 32. The sprocket 4 is fixed on a driving shaft 33 passing through the partition 34 of the camera and comprises a core 35 with spaced flanges 36 upon the periphery of which are the sprocket teeth 37 adapted to engage the perforations 38 of the film F. Upon the shaft 33 is mounted an abutment member 39, the top of which extends beyond the periphery of the flange 36 but not as far as the top of the teeth 37. It is engaged by the projection 18 in the side of the body portion 31 of the presser guide and the end of the spring 15 normally holds it in contact with the abutment 39. The guide member, therefore, does not contact with the film or the sprocket but the grooves 32 therein keep the film from accidental displacement from the sprocket teeth. The extension 20 extends down between the flanges 36. It might be possible for the film at the point A in Fig. 6 to adhere accidentally to a sprocket tooth and be carried in a loop down past the tongues 21 if this member 20 were not present.

Figure 5:
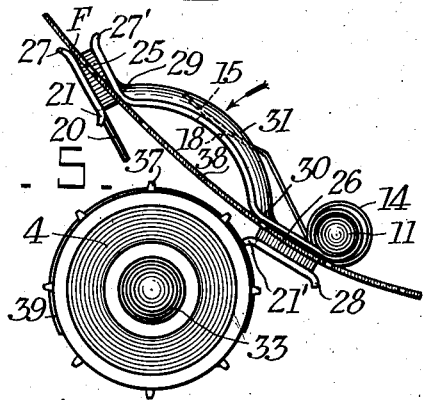
Fig. 5 is a side view of the sprocket and guide with the latter in open position for threading.
Figure 3:
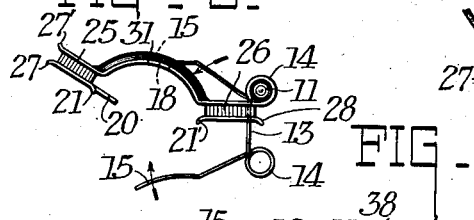
Fig. 3 is a side view of the film guide and the actuating spring.

In use the film loop is threaded laterally into the camera, the presser guides being swung to the position indicated in Fig. 5, where the loop can be readily inserted.

It is obvious that the presser guide herein described is a simple, convenient and inexpensive structure for filling all the requirements of an apparatus for amateur use in an efficient manner.

I contemplate as within the scope of my invention, all such modifications and equivalents as fall within the appended claims.

Having thus described my invention, what I claim as new and desire to secure by Letters Patent is:

1. In motion picture apparatus, in combination, a wheel for engaging and advancing a film band, and a guide adjacent said wheel and comprising a single sheet of metal having at its ends portions bent around from one edge to form open sided guide channels to conduct the film to and from the wheel, and bowed between the guide channels to conform to the curvature of the wheel.

2. In motion picture apparatus, in combination, a wheel for engaging and advancing a film band, a guide pivoted at one end adjacent said wheel and comprising a single sheet of metal having at its ends portions bent to form open sided guide channels and its intermediate portion bowed to conform to the curvature of the wheel and means to position the guide in operative position slightly spaced from the wheel.

3. In motion picture apparatus, in combination, a wheel for engaging and advancing a film band, a guide pivoted at one end adjacent said wheel and comprising a single sheet of metal having at its ends portions bent to form open sided guide channels and its intermediate portion bowed to conform to the curvature of the wheel, a spring for pressing the guide toward the wheel and an abutment for limiting its movement toward the wheel.

4. In motion picture apparatus, in combination, a sprocket having peripheral teeth for engaging and advancing a film band, a film guide pivoted adjacent said sprocket, a spring for pressing the guide toward the sprocket and an abutment for holding the guide slightly spaced from said sprocket, the film guide comprising a single sheet of metal bent near its ends to constitute open sided channel members with flaring ends to conduct the film to and from the sprocket, and bowed between said channel members to conform to the curvature of the sprocket.

5. In motion picture apparatus, in combination, a sprocket having spaced flanges with peripheral teeth for engaging and advancing a film band with perforated edges and a film guide comprising a single piece of sheet metal bent near its end to constitute open sided channel members to conduct the film to and from the sprocket and having an extension from one end extending into the space between the flanges to insure the proper passage of the film to the channel member directing it from the sprocket.

6. In motion picture apparatus, in combination, a wheel having spaced flanges for engaging at their peripheries and advancing a film band, and a film guide pivoted at one end and comprising a single sheet of metal bent at its ends to form guides to conduct film to and from said wheel and having an extension on its end remote from the pivot extending into the space between the flanges to insure the proper passage of the film to the channel member at that end, and means to position the guide in operative relation to the wheel.

Signed at Rochester, New York, this 13th day of November, 1924.

OTTO WITTEL.